US010288970B2

United States Patent
Wang

(10) Patent No.: US 10,288,970 B2
(45) Date of Patent: May 14, 2019

(54) NANO SMART GLASS SYSTEM

(76) Inventor: Qi Wang, Beijing (CN)

(*) Notice: Subject to any disclaimer, the term of this patent is extended or adjusted under 35 U.S.C. 154(b) by 0 days.

(21) Appl. No.: 13/824,312

(22) PCT Filed: May 25, 2012

(86) PCT No.: PCT/CN2012/076126
§ 371 (c)(1),
(2), (4) Date: May 24, 2013

(87) PCT Pub. No.: WO2012/159588
PCT Pub. Date: Nov. 29, 2012

(65) Prior Publication Data
US 2013/0242370 A1 Sep. 19, 2013

(30) Foreign Application Priority Data

May 25, 2011 (CN) .................. 2011 2 0170431 U

(51) Int. Cl.
E06B 9/24 (2006.01)
G02F 1/153 (2006.01)
G02F 1/163 (2006.01)

(52) U.S. Cl.
CPC ............ G02F 1/163 (2013.01); G02F 1/1533 (2013.01); E06B 2009/2464 (2013.01)

(58) Field of Classification Search
CPC .......... G02F 1/163; G02F 1/153; G02F 1/155; G02F 1/157; G02F 1/15; G02F 1/161;
(Continued)

(56) References Cited

U.S. PATENT DOCUMENTS

2001/0031403 A1* 10/2001 Giron .................... 429/304
2007/0285759 A1* 12/2007 Ash .................... B60J 3/04
359/275
(Continued)

FOREIGN PATENT DOCUMENTS

CN   201000517 Y   1/2008
CN   201037891 Y   3/2008
(Continued)

Primary Examiner — Thomas K Pham
Assistant Examiner — Sharrief I Broome
(74) Attorney, Agent, or Firm — Lewis Roca Rothgerber Christie LLP

(57) ABSTRACT

The present invention provides a nano smart glass system, including nano smart glass, DC power supply, sensor, and control unit. Wherein, the nano smart glass includes glass and the electrochromic thin-film device; The anode of the DC power supply connects to the at least one conductive anode layer of the electrochromic thin-film device; the cathode of the DC power supply connects to the at least one conductive cathode layer of the electrochromic thin-film device; the DC power supply is used to provide 1V-50V DC voltage to the electrochromic thin-film device; the electrochromic thin-film device adheres to the inside surface of the glass through the at least one conductive cathode layer or the at least one conductive anode layer; The sensor measures outdoor or indoor conditions and send the real-time measurement data to the control unit. The control unit connects to the DC power supply, and it can control the output voltage of the DC power supply to the electrochromic thin-film device. The present invention can real-time and intelligently adjust the color of the glass, which can help saving energy and reducing green house gas emission.

17 Claims, 2 Drawing Sheets

(58) Field of Classification Search
CPC .............. G02F 1/1533; G02F 1/1523; G02F 2001/1519; G02F 1/1521; G02F 2001/1515; G02F 1/133602; G02F 1/133603; G02F 1/1508; G02F 2001/1512; G02F 1/01
USPC ........ 359/265–275, 277, 245–247, 254, 242; 345/49, 105; 348/814, 817; 438/929; 349/182–186
See application file for complete search history.

(56) References Cited

U.S. PATENT DOCUMENTS

| | | | | |
|---|---|---|---|---|
| 2010/0208324 A1* | 8/2010 | Huang | ................. | G02F 1/1521 |
| | | | | 359/267 |
| 2016/0026061 A1* | 1/2016 | O'Keeffe | ............... | G02F 1/167 |
| | | | | 359/296 |
| 2016/0223878 A1* | 8/2016 | Tran | ........................ | G02F 1/155 |
| 2017/0315417 A1* | 11/2017 | Alton | ...................... | G02F 1/172 |

FOREIGN PATENT DOCUMENTS

| | | | |
|---|---|---|---|
| CN | 101592792 A | | 12/2009 |
| CN | 101833211 A | | 9/2010 |
| CN | 101971278 A | * | 2/2011 |
| CN | 202110359 U | | 1/2012 |
| JP | 2891361 B2 | | 5/1999 |
| WO | WO 2009/109813 A1 | | 9/2009 |

\* cited by examiner

NANO SMART GLASS SYSTEM

CROSS-REFERENCE TO RELATED APPLICATION(S)

This application is a National Phase Patent Application and claims priority to and benefit of International Application Number PCT/CN2012/076126, filed on May 25, 2012, which claims priority to and benefit of Chinese Patent Application Number 201120170041.4, filed on May 25, 2011, the entire disclosures of which are incorporated herein by reference.

BACKGROUND OF THE INVENTION

1. Field of the Invention

This present invention relates to a kind of glass, especially to a kind of nano smart glass system.

2. Description of the Prior Art

Technologies for manufacturing glasses commonly known as "smart glass" technologies have currently been industrialized. The smart glasses are commonly manufactured as polymer dispersed liquid crystal (PDLC) glass, and suspended particle device (SPD) glass. The PDLC glass is manufactured by attaching a liquid crystal film similar to the material used in the LCD TV onto the glass while the SPD glass is manufactured with glass coated with a polymer film containing colloidal particles. In the power-off state, due to the light scattering caused by the random distribution of liquid crystal or colloidal particles, it results in the glass in the opaque state; while in the power-on state, the particles in the film are arranged in order so to allow the light passing through the film, so it results in the glass in the transparent state.

There are some disadvantages about the PDLC and SPD glass such as:
1. When the power is off, the glass is in the opaque sate. In order to keep the glass transparent, the power must be always on, which will consume energy;
    In addition, when these types of glass are applied on the windows of the buildings, if some emergency events such as earthquake and fire, caused the power outrage, the opaque state of the windows will add additional difficulties on the rescue;
2. In order to control these types of glass, a relatively high AC voltage (24V-100V) is required.

SUMMARY OF THE PRESENT INVENTION

The main purpose of the present invention is to provide a new and improved nano smart glass system to intelligently adjust the color of the glass flexibly over a range of colors in real time such that greater energy savings can be achieved automatically.

In order to achieve this purpose, this present invention provides a nano smart glass system, including the nano smart glass, the DC power supply, sensor and the control unit wherein the nano smart glass includes glass and electrochromic thin-film device.

The electrochromic thin-film device is a multi-layers thin-film device, comprises at least one conductive cathode layer, at least one electrochromic layer, at least one ion conductive layer, at least one ion storage layer and at least one conductive anode layer.

The total thickness of the electrochromic thin-film device is between 100-5000 nm.

The conductive anode layer, the ion storage layer, the ion conductive layer, the electrochromic layer and the conductive cathode layer are thin films in nanometer scale, and the film materials are mainly the metal oxide and/or polymer materials.

The anode of the DC power supply connects to the at least one conductive anode layer of the electrochromic thin-film device; the cathode of the DC power supply connects to the at least one conductive cathode layer of the electrochromic thin-film device; the DC power supply is used to provide 1V-50V DC voltage to the electrochromic thin-film device.

For a large-area nano smart glass, the color changing speed of the electrochromic thin-film device becomes much slower, due to the increased the thin film resistance of the said anode and cathode layers. In order to overcome this issue, the electrochromic thin-film device can be divided into at least two regions by laser or other patterning methods. Each region is electrically isolated with the adjacent regions, and it is connected to the DC power supply independently. A single DC power supply can be used to provide the DC voltage to all of regions, or two or more DC power supplies can be used to provide the DC voltage to the two or more regions respectively. By this way, the color changing speed of the electrochromic thin-film device can be greatly improved.

The electrochromic thin-film device adheres to the inside surface of the glass through the at least one conductive cathode layer or the at least one conductive anode layer.

The control unit connects to the DC power supply, and it is used to control the output voltage of the DC power supply to the electrochromic thin-film device.

This nano smart glass system can be applied into different fields such as buildings and transportation vehicles (automobiles, train and airplane etc). While it is applied into buildings, it can be used as windows and glass curtain wall. While it is applied into transportation vehicles, it can be used as windows, moon roof, and rear-view mirrors etc.

As implemented, the nano smart glass system as claimed in the present invention, wherein, it also includes sensors being installed outside of the nano smart glass, and these sensors are connected to the control unit.

As implemented, the control unit includes the smart glass controllers and the central controller, the sensors are connected to the central controller;

The central controller connects to the sensors and the smart glass controllers respectively, it receives the real-time measurement data from the sensors, and according to the measurement data and the optimized energy management model, the central controller issues commands to the smart glass controllers.

Based on these commands, the smart glass controllers adjust the output voltage of the DC power supply to the electrochromic thin-film device.

The central controller also connects to the main energy management system in a building or a vehicle, it can send the real-time information of the nano smart glass status to the main energy management system, which can adjust the central air conditioning system, heating system, and/or lighting system in a building or a vehicle accordingly, so to save energy. The central controller can also receive the commands from the main energy management system, to control the smart glass controllers to adjust the status of the nano smart glass.

As implemented, the sensors are wired sensors, which are connected to the control unit by electrical wires.

As implemented, the sensors are wireless sensors, which are connected to the control unit by wireless network.

As implemented, when the sensors are installed in the outdoor or outside of a vehicle, the sensors include temperature sensors and/or light sensors, which could real-time and accurately measure the outdoor temperature and/or the light intensity, and then send the measured outdoor temperature and/or the light intensity to the control unit. According to the measurement data and the customized model, the control unit will adjust the output voltage of the DC power supply to the electrochromic thin-film device.

As implemented, when the sensors are installed inside the room or a vehicle, the sensors include temperature sensors and/or infrared sensors, which could real-time measure the indoor temperature and/or the people's activities in the room, and then send the measurement data back to the control unit. According to the measurement data and the customerized model, the control unit will adjust the output voltage of the DC power supply to the electrochromic thin-film device.

As implemented, the nano smart glass system as claimed in the present invention, wherein, it also includes the manual control switch.

The manual control switch is connected to the control unit electrically, and it can manually control the control unit which can adjust the output voltage of the DC power supply to the electrochromic thin-film device.

As implemented, the nano smart glass system as claimed in the present invention, wherein, it also includes the remote control switch;

The remote control switch is connected to the control unit wired or wirelessly, and it can remotely control the control unit which can adjust the output voltage of the DC power supply to the electrochromic thin-film device.

Compared to the PDLC and SPD technologies, the nano smart glass as claimed in the present invention has the following advantages:

(1) It can be controlled by using a very small DC voltage (1V-5V) and the leakage current is very low when power is on, so it has very low power consumption and can save energy;
(2) When the power is off, the glass is transparent; when the power is on, the glass is opaque; this characteristics is very important while the nano smart glass system is applied into the windows and/or glass curtain wall of a building. When the power outrage is caused by some emergency events such as earthquake and fire, the transparency state of the windows and/or the glass curtain wall will make the rescue easier.
(3) The core device comprises the multi-layer nano thin-film materials, the raw materials are easy to obtain, and these solid-state thin-film materials themselves can adsorb the light and thermal radiation, so it can also achieve the function of the low-E glass;
(4) The manufacturing processes of the nano thin-film materials are easy to be controlled, the film composition, uniformity and consistency can be well controlled; and the device is very stable and reliable.

DETAILED DESCRIPTION OF THE PREFERRED EMBODIMENT

The present invention provides a nano smart glass system, including nano smart glass, the DC power supply, the sensor, and the control unit. Wherein, the nano smart glass includes glass and the electrochromic thin-film device.

Figure 1:
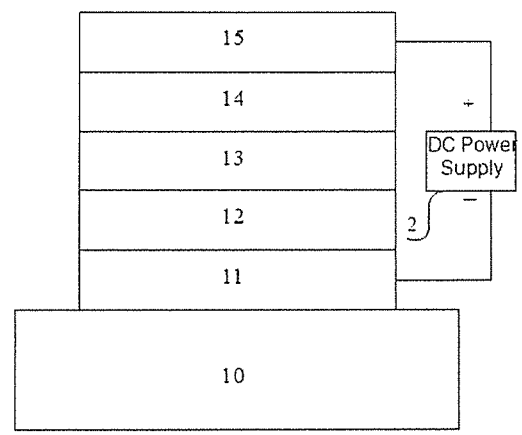
FIG. 1 is the schematic diagram which shows the electrochromic thin-film device of the nano smart glass as claimed in the present invention, is attached on the glass substrate.

As shown in FIG. 1, the electrochromic thin-film device consists of the order of at least one conductive cathode layer 11, at least one electrochromic layer 12, at least one ion conductive layer 13, at least one ion storage layer 14 and at least one conductive anode layer 15.

The total thickness of the electrochromic thin-film device is between 100-5000 nm.

The conductive cathode layer 11, the electrochromic layer 12, the ion conductive layer 13, the ion storage layer 14, and the conductive anode layer 15 are all thin films in nanometer scale, and the film materials are mainly the metal oxide, polymer materials or other chemical compounds; This thin-film device is transparent when the power is off.

The conductive cathode layer 11, the electrochromic layer 12, the ion conductive layer 13, the ion storage layer 14, and the conductive anode layer 15 are combined together to form an independent and complete electronic device.

As shown in FIG. 1, The anode of the DC power supply 2 connects to the at least one conductive anode layer 15 of the electrochromic thin-film device; the cathode of the DC power supply 2 connects to the at least one conductive cathode layer 11 of the electrochromic thin-film device; the DC power supply 2 is used to provide 1V-50V DC voltage to the electrochromic thin-film device.

The electrochromic thin-film device adheres to the inside surface of the glass through the at least one conductive cathode layer 11 or the at least one conductive anode layer 15.

The glass could be double pane insulated glass, single pane glass, or laminated glass.

While the glass is double pane insulated glass, the electrochromic device adheres to either one of the inside surfaces of the double pane insulated glass through the at least one conductive cathode layer 11 or at least one conductive anode layer 15, so the device is not in touch with the ambient directly.

While the glass is the laminated glass, the electrochromic thin-film device is placed in between two layers of the laminated glass.

While the glass is single pane glass, the electrochromic thin-film device is deposited on the inside surface of the single pane glass, so it is not in touch with outside ambient. Also, in the preferred condition, the electrochromic thin-film device is covered by a protection layer, which could be a deposited film, a plastic film or other transparent material. The main purpose of the protection layer is to protect the electrochromic thin-film device not being touched and scratched.

As shown in FIG. 1, the electrochromic thin-film device adheres onto the glass substrate 10 thru the at least one conductive cathode layer 11. The glass substrate 10 is the inside surface of either pane of the double pane insulated glass.

While the power is off for the electrochromic thin-film device, the nano smart glass is completely transparent. While a DC voltage between 1V to 50V is added to the electrochromic thin-film device, by increasing the voltage, the mobile ions inside the electrochromic thin-film device are driven by the electric filed to inject into the electrochromic layer, subsequently it will change the color, and also gradually block the light and radiated energy into the room. Reversely, by decreasing the voltage or changing the voltage direction, the nano smart glass can gradually change back to the transparent state.

Therefore, by the control of external power supply, the electrochromic thin-film device can continuously adjust the color of the nano smart glass, and the transmissivity of the light and heat through the nano smart glass. Subsequently, based on the people's demands and the outdoor climate change characteristics, it can adjust how much the light and heat could get into the room and/or the vehicle, so it can either remain the room and/or the vehicle warm or keep the heat out of the room and/or the vehicle. By this way, it will greatly reduce the demands to the air conditioning, the heat and the lighting in the buildings, or transportation vehicles, which will save energy, reduce green house gas emission, and improve people's comfort in a room or a vehicle.

Moreover, while the nano smart glass system is applied as the curtain wall or windows of a greenhouse for flowers and/or vegetables, it can smartly adjust how much sunshine pass into the house during different time in a day and different seasons in a year, so it can improve the quality of the flower or vegetable, and increase the yield of the greenhouse.

Figure 2:
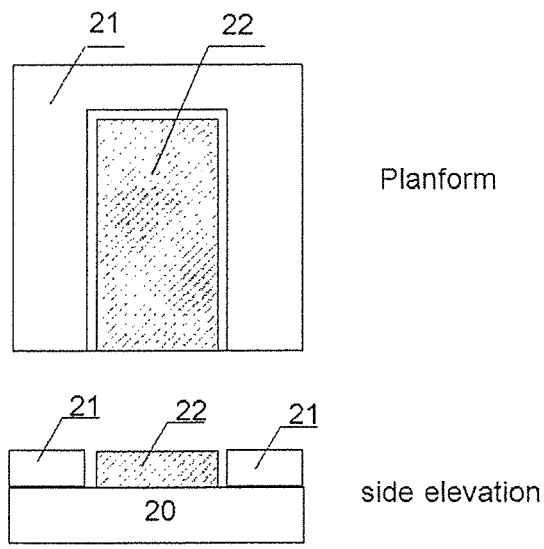
FIG. 2 is the schematic diagram of a large-area nano smart glass which shows the electrochromic thin-film device of the nano smart glass as claimed in the present invention is divided into 2 regions in order to improve the color changing speed.

For a large-area nano smart glass, the color changing speed of the electrochromic thin-film device becomes much slower, due to the increased the thin film resistance of the said anode and cathode layers. In order to overcome this issue, as shown in FIG. 2, the electrochromic thin-film device can be divided into at least two regions by laser or other patterning methods. Region 21 is electrically isolated with the adjacent region 22. A single DC power supply can be used to provide the DC voltage to both Region 21 and 22, or two DC power supplies (not shown in this figure) can be used to provide the DC voltage to the two regions respectively. By this way, the color changing speed of the electrochromic thin-film device can be greatly improved.

The control unit connects to the DC power supply. It is used to control the output voltage of the DC power supply to the electrochromic thin-film device. So it can control the color changing extent of the nano smart glass, and the transmission percentage of the light and heat through the nano smart glass.

Figure 3:
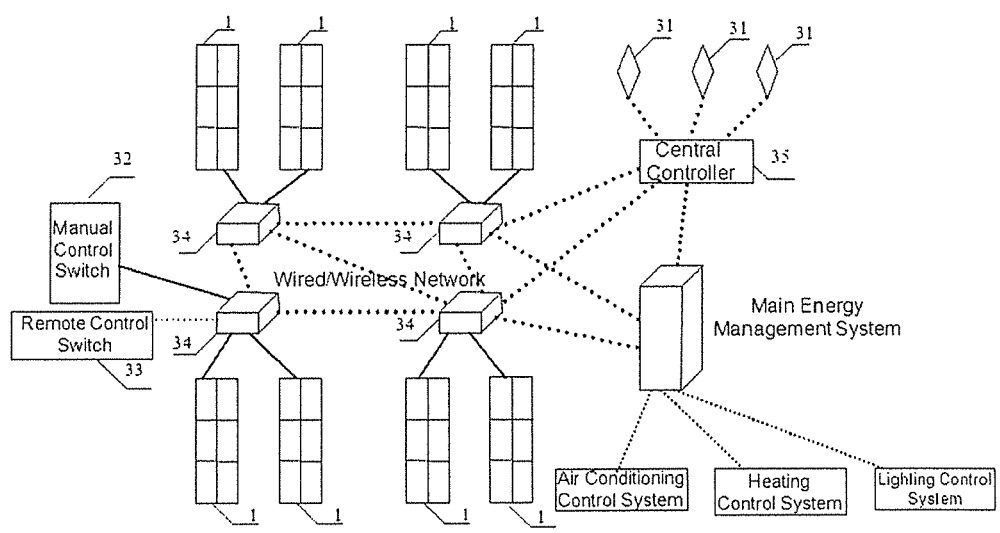
FIG. 3 is a detail framework diagram of the nano smart glass system as claimed in the present invention.

As shown in FIG. 3, according to one specific implementation method, the nano smart glass system as claimed in the present invention, includes nano smart glass 1, the DC power supply (not shown in this figure), the control unit and sensors 31. The sensors 31 are connected to the control unit.

The sensors 31 can be wireless sensors or wired sensors;

When the sensors 31 are wireless sensors, they are connected to the control unit by wireless network;

When the sensors 31 are wired sensors, they are connected to the control unit by electric wires.

When the sensors 31 are installed in the outdoor or outside of a vehicle, the sensors include temperature sensors and/or light sensors, which could real-time and accurately measure the outdoor temperature and/or the light intensity, and then send the measured outdoor temperature and/or the light intensity to the control unit. According to the measurement data and the customerized model, the control unit will adjust the output voltage of the DC power supply to the electrochromic thin-film device.

When the sensors are installed inside the room or a vehicle, the sensors include temperature sensors and/or infrared sensors, which could real-time measure the indoor temperature and/or the people's activities in the room, and then send the measurement data back to the control unit by electric wires or wireless network. According to the measurement data and the customerized model, the control unit will adjust the output voltage of the DC power supply to the electrochromic thin-film device.

The present invention integrates the nano smart glass, temperature sensors, light sensors, and infrared sensors into a smart control system. According to the demands in practical applications, it can real-time, intelligently and personalized adjust the color of the glass. So it can greatly reduce the demands to the air conditioning, the heat and the lighting in the building or a transportation vehicle, which can save energy and reduce green house gas emission. It can also increase the people's comfort of working in the room, and it can improve the yield and quality of flowers and vegetable in the greenhouse.

As shown in FIG. 3, according to one specific implementation method, the nano smart glass system as claimed in the present invention also includes manual control switch 32;

The manual control switch 32 is connected to the control unit electrically, and it can manually control the control unit which can adjust the output voltage of the DC power supply to the electrochromic thin-film device.

As shown in FIG. 3, according to one specific implementation method, the nano smart glass system as claimed in the present invention also includes remote control switch 33;

The remote control switch 33 is connected to the control unit wired or wirelessly, and it can remotely control the control unit which can adjust the output voltage of the DC power supply to the electrochromic thin-film device.

As shown in FIG. 3, according to one specific implementation method, the control unit includes the smart glass controller 34 and the central controller 35. The sensors 31 are connected to the central controller 35 by wired or wireless network. The central controller 35 receives the real-time measurement data from the sensors 31. According to the measurement data and the optimized energy management model, it sends the commands to the smart glass controllers 34. Based on the received commands, the smart glass controllers 34 adjust the output voltage of the DC power supply to the electrochromic thin-film device, so it can adjust how much the light and heat could get into the room, and also it can promptly send the information to the main energy management system of the building. Subsequently, the main energy management control system can efficiently drive the air conditioning or the heat control system to adjust the output of cool or warm air, and it can also efficiently drive the lighting control system to adjust the lighting intensity in the room, so it can maximize saving the energy, and reduce the carbon dioxide emission.

Since people may have different requirements for the lighting when they are in the different locations of the room, the nano smart glass system as claimed in the present invention, can manually or automatically adjust the light transmissivity of a local region's glass according to people's desire, so it can assure the people working comfortable in the room.

The major manufacturing process in the present invention is the manufacturing process of the electrochromic thin-film device on the glass. Wherein, the key processes are the deposition processes of the five or more layers of the nano thin films. There are many methods to deposit these nano thin films such as magnetron vacuum sputtering deposition, vacuum evaporation, laser induced deposition, chemical vapor deposition, plasma enhanced chemical vapor deposition, atomic layer deposition, sol-gel methods and etc.

The performance of the electrochromic thin-film device can be manipulated by the selection of deposition methods and the specific deposition conditions such as temperature, pressure, power density, gas flow rate and etc. Given an optimized deposition condition, the device electrochromic properties can be improved. One of the reasons is because the surface roughness of the as-deposited thin film is greatly decreased, which reduces the interfacial defects between the adjacent layers. The interfacial defects could trap the mobile ion and significantly degrades the performance of the electrochromic thin-film device. By reducing the interfacial defects, it increases the total amount of mobile ions and the ion mobility which improves the device performance.

The overall manufacturing process of the electrochromic thin-film device is a production flow line process. Here let use magnetron vacuum sputtering deposition method as an example: first, the glass is being cleaned using the appropriate washing method, then the major equipments of the production flow line are five or more magnetron vacuum sputtering deposition tools. Each tool has one metal oxide or mixture target and it uses sputtering method to deposit one certain type of the film. The glass will sequentially go through these five (or more) deposition tools to finish the thin film deposition processes, then the as-deposited multi-layers nano thin films may go through the patterning and other processes, to complete the manufacturing of the core electronic device. Afterwards, the device may be connected to the control circuit, and finally the whole system is packed onto the glass.

After packaging, the nano smart glass can connect to the external power supply which will be controlled by the control unit. The control unit can be connected to the manual control switch or the sliding control stick, which can manually control the nano smart glass, or it can be connected to the local controller, and then the central controller can drive the local controller to control the glass automatically and intelligently.

The above descriptions of the present invention are presented for purposes of illustration and not limitation. Given the conditions not divorced from the spirit and scope of the claims, the ordinary technology personnel in this field may make many modifications, changes or equivalent, but all of them will fall into the protection region of this present invention.

I claim:

1. A nano smart glass system comprising:
a nano smart glass, a DC power supply, a sensor, and a control unit, wherein the nano smart glass includes glass and an electrochromic thin-film device on a surface of the glass, and
the sensor is installed outside of the nano smart glass and connected to the control unit;
wherein:
the electrochromic thin-film device comprises at least two regions at a same level on the surface of the glass, and each region is on a separate area of the surface of the glass, and spaced laterally from adjacent regions, and connected to the DC power supply independently; further, a single DC power supply is utilized to provide a DC voltage to all of the regions, or two or more DC power supplies are utilized to provide the DC voltage to two or more regions respectively,
wherein the at least two regions comprises a first region and a second region, the first region has a U shape and the second region is in a space defined by the U-shape, the first region and the second region each comprise at least one electrochromic layer, all the electrochromic layer of the first region is separated by a gap and electrically isolated from all the electrochromic layer of the second region, and
wherein each region forms an independent and complete electronic device.

2. The nano smart glass system of claim 1 wherein:
the electrochromic thin-film device is a multi-layers thin-film device, consisting of the order of at least one conductive cathode layer, the at least one electrochromic layer, at least one ion conductive layer, at least one ion storage layer and at least one conductive anode layer.

3. The nano smart glass system of claim 1 wherein:
a total thickness of the electrochromic thin-film device is between 100-5000 nm.

4. The nano smart glass system of claim 2, wherein:
the conductive anode layer, the ion storage layer, the ion conductive layer, the electrochromic layer and the conductive cathode layer are all thin films in nanometer scale, and the thin films comprise metal oxide and/or polymer materials.

5. The nano smart glass system of claim 2, wherein:
an anode of the DC power supply connects to the at least one conductive anode layer of the electrochromic thin-film device; a cathode of the DC power supply connects to the at least one conductive cathode layer of the electrochromic thin-film device; the DC power supply is used to provide 1V-50V DC voltage to the electrochromic thin-film device.

6. The nano smart glass system of claim 2, wherein:
the electrochromic thin-film device adheres to an inside surface of the glass through the at least one conductive cathode layer or the at least one conductive anode layer.

7. The nano smart glass system of claim 1 wherein:
the control unit connects to the DC power supply, and it is utilized to control an output voltage of the DC power supply to the electrochromic thin-film device.

8. The nano smart glass system as claimed in claim 1, wherein:
the control unit includes a smart glass controllers and a central controller, the sensors are connected to the central controller.

9. The nano smart glass system as claimed in claim 8, wherein:
the central controller connects to the sensors and the smart glass controllers respectively, it receives a real-time measurement data from the sensors, and according to the measurement data and an optimized energy management model that is stored in the central controller, the central controller issues commands to the smart glass controllers, based on these commands, the smart glass controllers adjust an output voltage of the DC power supply to the electrochromic thin-film device; and the central controller also connects to a main energy management system in a building, it can send a real-time information of the nano smart glass status to the main energy management system, which can adjust a central air conditioning system, heating system, and/or lighting system in a building or factory accordingly, so to save energy; and the central controller can also receive the commands from the main energy management system, to control the smart glass controllers to adjust the status of the nano smart glass.

10. The nano smart glass system as claimed in claim 1, wherein the sensors are wired sensors, which are connected to the control unit by electrical wires.

11. The nano smart glass system as claimed in claim 1, wherein the sensors are wireless sensors, which are connected to the control unit by wireless network.

12. The nano smart glass system as claimed in claim 1, wherein, when the sensors are installed in an outdoor or outside of a vehicle, the sensors include temperature sensors and/or light sensors, which could real-time and accurately measure an outdoor temperature and/or a light intensity, and then send the measured outdoor temperature and/or the light intensity to the control unit; according to the measured outdoor temperature and/or the light intensity, the control unit will adjust an output voltage of the DC power supply to the electrochromic thin-film device.

13. The nano smart glass system as claimed in claim 1, wherein, when the sensors are installed inside a room or a vehicle, the sensors include temperature sensors and/or infrared sensors, which are configured to real-time measure an indoor temperature and/or people's activities in the room, and then send a measurement data back to the control unit; according to the measurement data and a customerized model, the control unit will adjust an output voltage of the DC power supply to the electrochromic thin-film device.

14. The nano smart glass system as claimed in claim 1, further comprising:
a manual control switch is connected to the control unit by electrical wire, and it can manually control the control unit which can adjust an output voltage of the DC power supply to the electrochromic thin-film device.

15. The nano smart glass system as claimed in claim 1, further comprising:
a remote control switch is connected to the control unit wired or wirelessly, and it can remotely control the control unit which can adjust an output voltage of the DC power supply to the electrochromic thin-film device.

16. The nano smart glass system as claimed in claim 1, wherein the at least two regions is divided by laser.

17. A nano smart glass system comprising:
a nano smart glass, a DC power supply, a sensor, and a control unit, wherein the nano smart glass includes glass and an electrochromic thin-film device on a surface of the glass, and
the sensor is installed outside of the nano smart glass and connected to the control unit;
wherein:
the electrochromic thin-film device comprises at least two regions at a same level on the surface of the glass, and each region is on a separate area of the surface of the glass, and spaced laterally from adjacent regions, and connected to the DC power supply independently; further, a single DC power supply is utilized to provide a DC voltage to all of the regions, or two or more DC power supplies are utilized to provide the DC voltage to two or more regions respectively,
wherein the at least two regions comprises a first region and a second region, the first region has a U shape and the second region is in a space defined by the U-shape, the first region and the second region each comprise at least one electrochromic layer, all the electrochromic layer of the first region is separated by a gap and disconnected from all the electrochromic layer of the second region, and
wherein each region forms an independent and complete electronic device.

* * * * *